United States Patent
Yoshida et al.

(10) Patent No.: US 7,282,850 B2
(45) Date of Patent: Oct. 16, 2007

(54) VACUUM ULTRAVIOLET-EXCITED ULTRAVIOLET PHOSPHOR AND LIGHT-EMITTING DEVICE THAT USES THIS PHOSPHOR

(75) Inventors: Hisashi Yoshida, Tokyo (JP); Ryo Yoshimatsu, Tokyo (JP)

(73) Assignee: NEC Corporation (JP)

( * ) Notice: Subject to any disclaimer, the term of this patent is extended or adjusted under 35 U.S.C. 154(b) by 424 days.

(21) Appl. No.: 10/945,446

(22) Filed: Sep. 20, 2004

(65) Prior Publication Data

US 2005/0062398 A1    Mar. 24, 2005

(30) Foreign Application Priority Data

Sep. 19, 2003    (JP) ............................. 2003-328130

(51) Int. Cl.
*C09K 11/08*    (2006.01)
(52) U.S. Cl. ...................... 313/486; 313/584; 313/637; 252/301.4 R
(58) Field of Classification Search ........ 313/484–487, 313/584–587, 637–643, 607; 252/301.4 R See application file for complete search history.

(56) References Cited

U.S. PATENT DOCUMENTS

| | | | |
|---|---|---|---|
| 6,090,310 A * | 7/2000 | Rao et al. ............. | 252/301.4 R |
| 6,555,963 B1 * | 4/2003 | Snijkers-Hendrickx et al. ......................... | 313/486 |
| 2005/0242702 A1 * | 11/2005 | Justel et al. ................ | 313/485 |

FOREIGN PATENT DOCUMENTS

| | | |
|---|---|---|
| JP | 2001-081460 | 3/2001 |
| JP | 2001-172624 | 6/2001 |
| JP | 2001-172626 | 6/2001 |
| JP | 2002-348571 | 12/2002 |
| JP | 2003-194721 | 7/2003 |

\* cited by examiner

*Primary Examiner*—Karabi Guharay
*Assistant Examiner*—Christopher M. Raabe
(74) *Attorney, Agent, or Firm*—Ostrolenk, Faber, Gerb & Soffen, LLP

(57) ABSTRACT

A vacuum ultraviolet-excited phosphor is composed of a gadolinium-activated rare-earth aluminum-scandium borate that is represented by a general formula $(Y_{1-x}Gd_x)Al_{3-y}Sc_y(BO_3)_4$ (where $0<x\leq 1$, $0<y\leq 3$). This vacuum ultraviolet-excited phosphor, when irradiated by vacuum ultraviolet light having a wavelength of 200 nm or less, can produce ultraviolet light having wavelength in the range from 312 nm to 315 nm with higher efficiency and stronger emitted intensity, and can obtain a higher areal intensity ratio than a phosphor of the prior art.

11 Claims, 6 Drawing Sheets

VACUUM ULTRAVIOLET-EXCITED ULTRAVIOLET PHOSPHOR AND LIGHT-EMITTING DEVICE THAT USES THIS PHOSPHOR

BACKGROUND OF THE INVENTION

1. Field of the Invention

The present invention relates to a vacuum ultraviolet-excited ultraviolet phosphor and to a light-emitting device that use this phosphor.

2. Description of the Related Art

Light-emitting devices such as fluorescent lamps and displays have come into wide use. Among these devices are lamps that use mercury as an excitation source, but with the increasing awareness regarding the impact on the environment in recent years, there is now an intensive search for light-emitting devices that do not employ mercury as an excitation source.

In addition, ultraviolet light of wavelength 254 nm that is radiated by mercury has a strong effect on human eyes and skin, and light-emitting devices that employ mercury as an excitation source therefore necessitate measures such as shielding to prevent the escape of ultraviolet rays, and these measures have been an obstacle to the miniaturization of the light-emitting devices. Still further, the mercury vapor pressure in mercury lamps drops in cold atmosphere such as in frigid regions or during winter, and discharge is therefore difficult to initiate in such cases. Even when discharge is started, there is the problem that the rise in temperature after lighting results in an increase in the mercury vapor pressure inside the bulb, with the consequence that the light-emitting intensity varies from the time of lighting until a stable state is achieved. A mercury lamp therefore requires time until light output stabilizes and has a slow rise-time characteristic. For these reasons as well, light-emitting devices that do not employ mercury are now in great demand.

Discharge lamps that use a rare gas such as xenon are known as light-emitting devices that do not use mercury as an excitation source. Rare-gas discharge ultraviolet fluorescent lamps do not suffer from the above-described problems that arise when mercury is used as the excitation source and therefore have potential in applications that have been receiving attention in recent years such as in deodorizing devices that take advantage of photocatalytic reactions using titanium oxide and in trans-illuminators for use in DNA analysis. In addition, with the technological advances in recent years, displays that are made up of plasma display panels that use rare gas as an excitation source are now receiving attention as a replacement for devices that are constituted by color Braun-tubes.

Ultraviolet phosphors that are known for use in such light-emitting devices include $SrB_4O_7$: Eu, $BaSi_2O_5$: Pb, $YPO_4$: Ce and $LaPO_4$: Ce. In addition, Japanese Patent Laid-Open Publication No. 081460/2001 and Japanese Patent Laid-Open Publication No. 172624/2001 disclose ultraviolet phosphors that contain gadolinium (Gd). Japanese Patent Laid-Open Publication No. 348571/2002 further discloses a vacuum ultraviolet-excited ultraviolet phosphor that is composed of a gadolinium-activated rare-earth aluminoborate that is represented by the general formula $(Y_{1-x}Gd_x)Al_3(BO_3)_4$ (where $0<x \leq 1$).

It is known that phosphors that are composed of, for example, $SrB_4O_7$: Eu, $BaSi_2O_5$: Pb, $YPO_4$: Ce and $LaPO_4$: Ce that have been used in the prior art emit light by excitation by ultraviolet light having a wavelength of 254 nm that is emitted by mercury, but the intensity of light emission by excitation by vacuum ultraviolet light (VUV) of wavelengths below 200 nm is inadequate. Thus, when these phosphors are applied to light-emitting devices that use a rare gas as an excitation source, adequate light emission characteristics cannot be obtained.

Finally, although the vacuum ultraviolet light-excited ultraviolet phosphor that is composed of the gadolinium activated rare-earth aluminoborate that is represented by the general formula $(Y_{1-x}Gd_x)Al_3(BO_3)_4$ (where $0<x \leq 1$) that is disclosed in Japanese Patent Laid-Open Publication No. 348571/2002 features excellent ultraviolet light emission intensity when compared to phosphors composed of the above-described $SrB_4O_7$: Eu, $BaSi_2O_5$: Pb, $YPO_4$: Ce and $LaPO_4$: Ce, these light-emission characteristics are still unsatisfactory when applied to various light-emitting devices. The market therefore still demands a phosphor that has still greater light-emitting intensity and can deliver ultraviolet light at higher efficiency.

SUMMARY OF THE INVENTION

It is an object of the present invention to provide a vacuum ultraviolet-excited ultraviolet phosphor having strong light-emitting intensity that can deliver ultraviolet light with high efficiency, and a light-emitting device that uses this phosphor.

As a result of continued research and development, the inventors of the present invention have succeeded in discovering that the addition of scandium (Sc), at a prescribed molar ratio with respect to the molar mass of aluminum (Al), to a phosphor in which gadolinium (Gd) is added to crystals of $YAl_3(BO_3)_4$ produced superior ultraviolet light-emission characteristics. In particular, it was found that when a vacuum ultraviolet-excited phosphor that is composed of a gadolinium-activated rare-earth aluminum-scandium borate represented by a general formula $(Y_{1-x}Gd_x)Al_{3-y}Sc_y(BO_3)_4$ (where $0<x \leq 1$, $0<y \leq 3$) was irradiated by a vacuum ultraviolet light having a wavelength of 200 nm or less, an areal intensity ratio that is higher than a prior-art phosphor within the wavelength range of 312 nm-315 nm could be obtained, and that the light-emission intensity was stronger and ultraviolet light could be produced at higher efficiency.

Accordingly, vacuum ultraviolet-excited phosphor according to an embodiment of the present invention is composed of a gadolinium activated rare-earth aluminum-scandium borate that is represented by the general formula $(Y_{1-x}Gd_x)Al_{3-y}Sc_y(BO_3)_4$ (where $0<x \leq 1$, $0<y \leq 3$).

In addition, an ultraviolet luminescent fluorescent lamp according to another embodiment of the present invention, which is one light-emitting device, includes: a translucent hermetic vessel, a discharge medium for discharging vacuum ultraviolet light that is sealed within a translucent hermetic vessel; discharge electrodes; and a phosphor layer that is formed on the inner surface of the translucent airtight vessel. This phosphor layer includes a vacuum ultraviolet-excited phosphor that is composed of a gadolinium-activated rare-earth aluminum-scandium borate represented by a general formula $(Y_{1-x}Gd_x)Al_{3-y}Sc_y(BO_3)_4$ (where $0<x \leq 1$, $0<y \leq 3$).

According to this configuration, an ultraviolet luminescent fluorescent lamp can be provided in which excitation by vacuum ultraviolet light that is radiated by the discharge medium causes efficient emission of ultraviolet light within a UV-B wavelength range of 312 nm-315 nm.

Further, the ultraviolet luminescent fluorescent lamp may be a fluorescent lamp having a cold cathode or hot cathode. In the case of a configuration having a cold cathode, an ultraviolet luminescent fluorescent lamp can be provided that features improved UV-B ultraviolet light light-emission intensity, compact size, and long life. In the case of a configuration having a hot cathode, the lamp current can be increased to obtain an improvement in the light-emission intensity of UV-B ultraviolet light.

In addition, the ultraviolet luminescent fluorescent lamp may be constituted as a planar fluorescent lamp. By means of this configuration, a planar ultraviolet luminescent fluorescent lamp can be obtained that features improved light-emission intensity of UV-B ultraviolet light and increased ultraviolet light emitting area.

Alternatively, the ultraviolet luminescent fluorescent lamp may be constituted as a fluorescent lamp with external electrodes. By means of this configuration, an ultraviolet luminescent fluorescent lamp can be provided that features not only simple construction and low cost, but also improved UV-B ultraviolet light light-emission intensity, compact size, and moreover, long life.

Still further, the discharge medium may be a rare gas, and the rare gas may be xenon gas.

In a plasma display panel according to yet another embodiment of the present invention, which is one of a light-emitting device, a front glass substrate and a rear glass substrate are arranged to confront each other, and discharge is brought about in display cells that are formed between the glass substrates to cause a phosphor layer that is formed inside the display cells to emit light and thus realize display. This phosphor layer includes a vacuum ultraviolet-excited phosphor that is composed of a gadolinium-activated rare-earth aluminum-scandium borate represented by a general formula $(Y_{1-x}Gd_x)Al_{3-y}Sc_y(BO_3)_4$ (where $0<x\leq1$, $0<y\leq3$).

The above and other objects, features, and advantages of the present invention will become apparent from the following description with reference to the accompanying drawings, which illustrate examples of the present invention.

Figure 1:
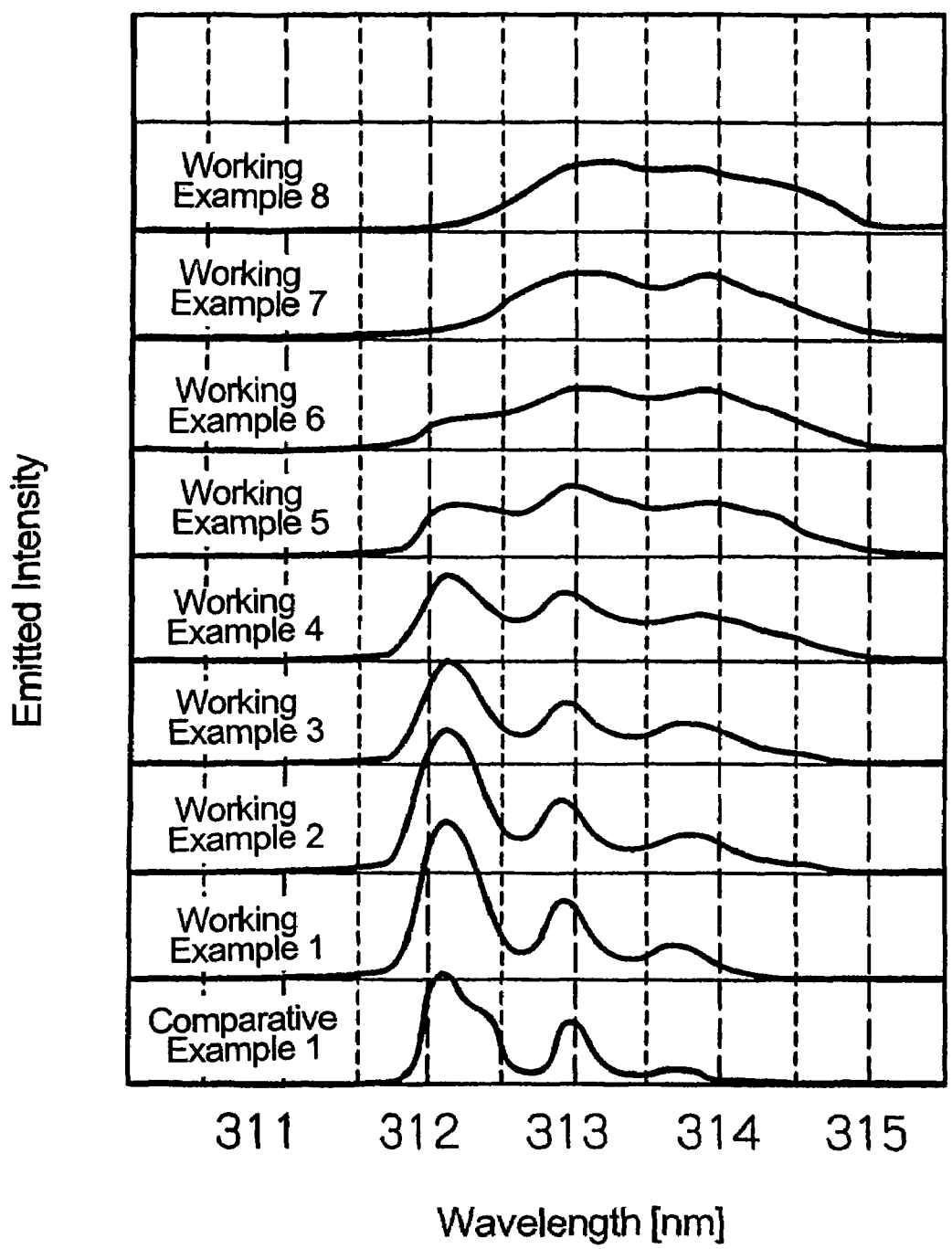
FIG. 1 is a graph showing a comparison of the relationship between the emitted wavelength of phosphors and the light-emission intensity according to each working example of the present invention and comparative examples.

DETAILED DESCRIPTION OF THE PREFERRED EMBODIMENTS (1) Vacuum Ultraviolet-Excited Ultraviolet Phosphor As described hereinabove, as a result of continued research and development, the inventors of the present invention have succeeded in discovering that the addition of scandium (Sc), at a prescribed molar ratio with respect to the molar mass of aluminum (Al), to a phosphor in which gadolinium (Gd) is added to crystals of $YAl_3(BO_3)_4$ produced superior light-emission characteristics of ultraviolet light; and have succeeded in obtaining a vacuum ultraviolet-excited phosphor that is composed of a gadolinium-activated rare-earth aluminum-scandium borate represented by the general formula $(Y_{1-x}Gd_x)Al_{3-y}Sc_y(BO_3)_4$ (where $0<x\leq1$, $0<y\leq3$).

In regard to the method of fabricating the vacuum ultraviolet-excited phosphor of the present embodiment, an yttrium compound such as yttrium oxide, a gadolinium compound such as gadolinium oxide, an aluminum compound such as aluminum oxide, a scandium compound such as scandium oxide, and a boron compound such as boron oxide are first prepared as the basic materials of this phosphor. These basic materials are next weighed, collected, and well mixed by means of a wet or dry method in accordance with the above-described compositional formula.

These materials are next poured into a heat-resistant receptacle such as a crucible that is composed of alumina, carbon, or platinum, and undergo pre-sintering at a temperature of 400-600° C. The materials next undergo main sintering for 3-20 hours in air at a temperature of 900-1200° C., and the obtained sintered material is next subjected to pulverization, washing, drying, and sorting to obtain the vacuum ultraviolet-excited ultraviolet phosphor of the present embodiment.

The above-described pre-sintering and main sintering may be carried out in an oxidizing atmosphere. Further, the phosphor that has been obtained as described above may again undergo sintering and then similarly undergo the processes of pulverization, washing, drying and sorting to obtain the vacuum ultraviolet-excited phosphor.

An actual example of the vacuum ultraviolet-excited ultraviolet phosphor of the present embodiment is next described with reference to the following working examples.

WORKING EXAMPLE 1

As the raw materials of the phosphor, 1.66 g of $Y_2O_3$, 0.889 g of $Gd_2O_3$, 2.900 g of $Al_2O_3$, 0.135 g of $Sc_2O_3$, and 2.730 g of $B_2O_3$ are each weighed, and following uniform mixing, are poured into a crucible made of alumina and subjected to pre-sintering for two hours at 500° C. in air. The sintering temperature is raised to 1100° C., and after sintering for five hours in air, the material undergoes slow cooling to obtain a sintered material. The obtained sintered material next undergoes pulverization, cleaning, drying, and sorting processes to obtain the vacuum ultraviolet-excited ultraviolet phosphor according to Working Example 1 having a composition of $Y_{0.75}Gd_{0.25}Al_{2.9}Sc_{0.1}(BO_3)_4$.

WORKING EXAMPLES 2-9

The ratios among the Y component, Gd component, Al component and Sc component were modified as appropriate and the processes of, for example, mixing and sintering were carried out under the same conditions as in the Working Example 1 to obtain vacuum ultraviolet-excited ultraviolet phosphors having the compositions as shown in Table 1 below: $Y_{0.75}Gd_{0.25}Al_{2.5}Sc_{0.5}(BO_3)_4$ (Working Example 2), $Y_{0.75}Gd_{0.25}Al_{2.0}Sc_{1.0}(BO_3)_4$ (Working Example 3), $Y_{0.75}Gd_{0.25}Al_{1.5}Sc_{1.5}(BO_3)_4$ (Working Example 4), $Y_{0.75}Gd_{0.25}Al_{1.0}Sc_{2.0}(BO_3)_4$ (Working Example 5), $Y_{0.75}Gd_{0.25}Al_{0.5}Sc_{2.5}(BO_3)_4$ (Working Example 6), $Y_{0.75}Gd_{0.25}Al_{0.1}Sc_{2.9}(BO_3)_4$ (Working Example 7), $Y_{0.75}Gd_{0.25}Sc_{3.0}(BO_3)_4$ (Working Example 8), and $Y_{0.5}Gd_{0.5}Al_{1.5}Sc_{1.5}(BO_3)_4$ (Working Example 9).

COMPARATIVE EXAMPLES 1 and 2

A phosphor composed of $BaSi_2O_5$: Pb was prepared as Comparative Example 1. As Comparative Example 2, a vacuum ultraviolet-excited ultraviolet phosphor was prepared that was composed of gadolinium-activated rare-earth aluminoborate that is represented by $Y_{0.75}Gd_{0.25}Al_3(BO_3)_4$ and disclosed in Japanese Patent Laid-Open Publication No. 348571/2002.

TABLE 1

| | Composition | Peak Intensity Ratio | Areal intensity ratios for wavelengths of 312 nm to 315 nm |
|---|---|---|---|
| Working Example 1 | $Y_{0.75}Gd_{0.25}Al_{2.9}Sc_{0.1}(BO_3)_4$ | 21 | 1.9 |
| Working Example 2 | $Y_{0.75}Gd_{0.25}Al_{2.5}Sc_{0.5}(BO_3)_4$ | 19 | 2.0 |
| Working Example 3 | $Y_{0.75}Gd_{0.25}Al_{2.0}Sc_{1.0}(BO_3)_4$ | 14 | 1.9 |
| Working Example 4 | $Y_{0.75}Gd_{0.25}Al_{1.5}Sc_{1.5}(BO_3)_4$ | 11 | 2.0 |
| Working Example 5 | $Y_{0.75}Gd_{0.25}Al_{1.0}Sc_{2.0}(BO_3)_4$ | 9 | 1.9 |
| Working Example 6 | $Y_{0.75}Gd_{0.25}Al_{0.5}Sc_{2.5}(BO_3)_4$ | 8 | 1.8 |
| Working Example 7 | $Y_{0.75}Gd_{0.25}Al_{0.1}Sc_{2.9}(BO_3)_4$ | 9 | 1.8 |
| Working Example 8 | $Y_{0.75}Gd_{0.25}Sc_{3.0}(BO_3)_4$ | 9 | 1.9 |
| Working Example 9 | $Y_{0.5}Gd_{0.5}Al_{1.5}Sc_{1.5}(BO_3)_4$ | 11 | 1.9 |
| Comparative Example 1 | $BaSi_2O_5$:Pb | 1 | 1.0 |
| Comparative Example 2 | $Y_{0.75}Gd_{0.25}Al_3(BO_3)_4$ | 15 | 1.2 |

Figure 2:
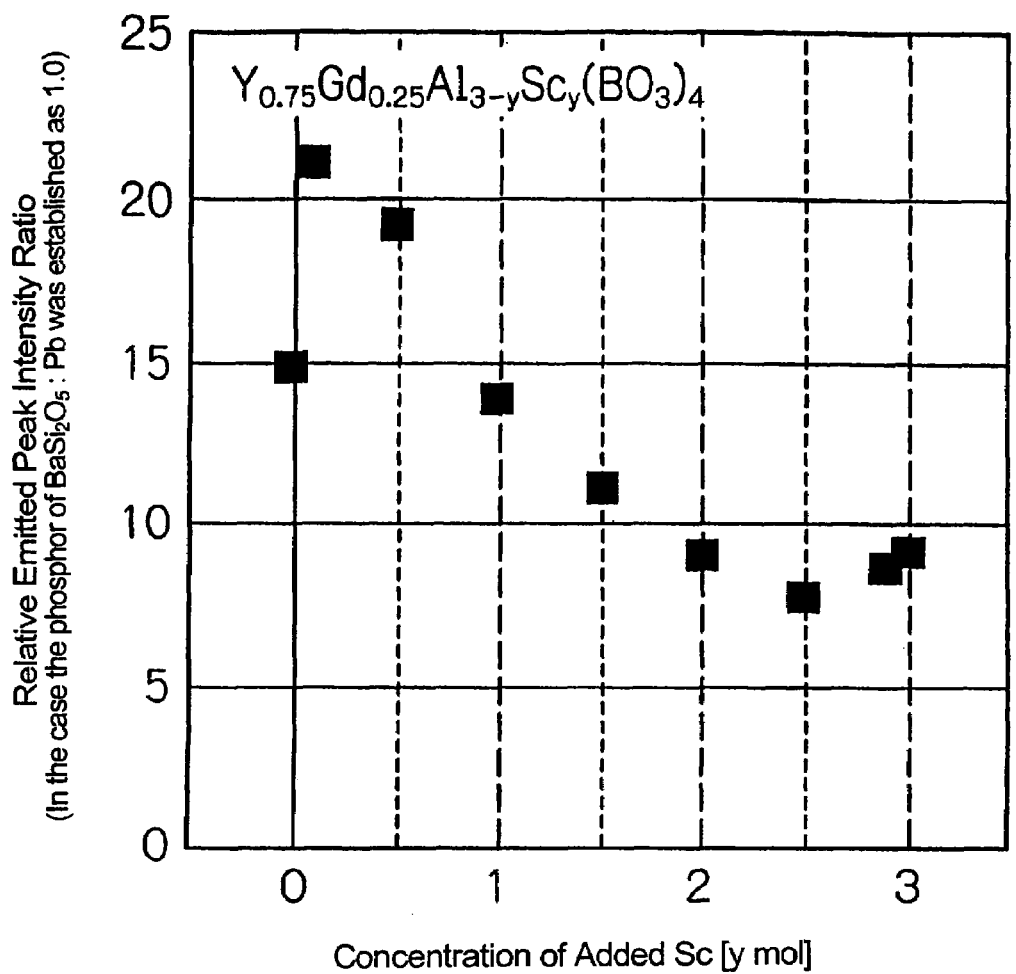
FIG. 2 is a graph showing the relation between the relative emitted peak intensity ratio and the concentration of added Sc in the vacuum ultraviolet-excited ultraviolet phosphor according to the present invention.

FIG. 1 is a graph showing a comparison of the relationship between the emitted wavelength and emitted intensity of the phosphors according to each of the working examples of the present invention and the comparative examples. FIG. 2 is a graph showing the relation between the relative emitted peak intensity ratio and the concentration of added Sc in vacuum ultraviolet-excited ultraviolet phosphors according to the present invention.

As shown in FIG. 1, the wavelength of ultraviolet light that is emitted by the phosphors of the present working examples ranges from approximately 312 nm to 315 nm. Table 1 shows the areal intensity ratios for wavelengths of 312 nm to 315 nm for each of Working Examples 1-9 and Comparative Examples 1 and 2. These areal intensity ratios are shown using values for a case in which Comparative Example 1 ($BaSi_2O_5$: Pb) was established as 1.0. It can be seen from Table 1 that, by adding scandium (Sc) at a prescribed molar ratio with respect to the molar mass of aluminum (Al), the areal intensity ratio of the emission of ultraviolet light for vacuum ultraviolet-excited ultraviolet phosphors of the present working examples is a maximum of 2.0 times that of Comparative Example 1 ($BaSi_2O_5$: Pb).

Referring to FIG. 2, it can be seen that by adding scandium (Sc) at a prescribed molar ratio with respect to the molar mass of aluminum (Al), the peak intensity of emitted light in a vacuum ultraviolet-excited ultraviolet phosphor of the present working example is a maximum of 21 times that of the prior-art phosphor of Comparative Example 1 ($BaSi_2O_5$: Pb).

Thus, a vacuum ultraviolet-excited ultraviolet phosphor according to the present embodiment has a strong emitted intensity and can supply ultraviolet light at high efficiency, and therefore can be applied to various types of light-emitting devices that take a rare gas such as xenon as the excitation source. Light-emitting devices in which this vacuum ultraviolet-excited ultraviolet phosphor can be applied include, for example, a variety of ultraviolet luminescent fluorescent lamps that take a discharge medium that radiates vacuum ultraviolet light and a phosphor layer that emits UV-B ultraviolet light as essential compositional requirements and that exhibit characteristic effects that are ideal for various devices by combining such elements as the form of the lamp, i.e., the form of the translucent airtight vessel (straight tube, curved tube, planar, etc.), the form of electrode action (such as hot cathode or cold cathode), and the presence or absence of internal electrodes (such as the external electrode type).

Explanation next regards examples of light-emitting devices in which vacuum ultraviolet-excited ultraviolet phosphors according to the present embodiment can be applied.

(2) Straight-Tube Cold-Cathode Fluorescent Lamp

Figure 3:
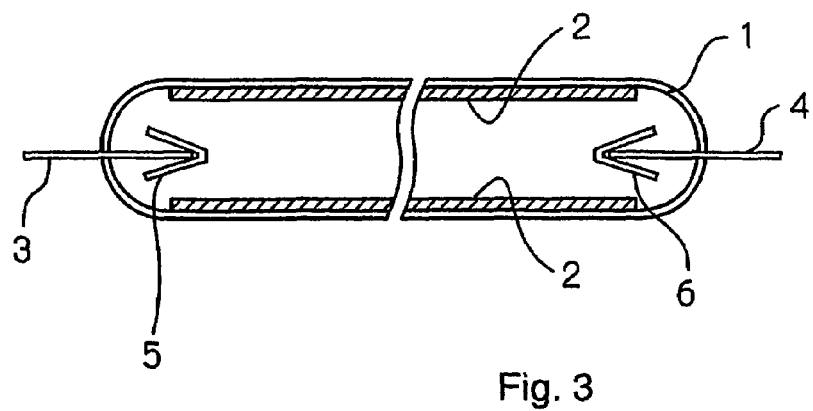
FIG. 3 is a sectional view showing a straight-tube cold cathode fluorescent lamp according to an embodiment of the present invention.

FIG. 3 is a sectional view showing a straight-tube cold-cathode fluorescent lamp according to an embodiment of the present invention.

In this straight-tube ultraviolet luminescent fluorescent lamp, phosphor layer 2 containing a vacuum ultraviolet-excited phosphor [general formula $(Y_{1-x}Gd_x)Al_{3-y}Sc_y(BO_3)_4$ ($0<x \leq 1$, $0<y \leq 3$)] that is composed of a gadolinium-activa rare-earth aluminum-scandium borate that emits light by vacuum ultraviolet excitation is formed on the inner walls of a translucent hermetic vessel that is composed of soda glass tube 1, and xenon gas is sealed inside glass tube 1.

Lead lines 3 and 4 are sealed at both ends of glass tube 1, and cold cathodes 5 and 6, in which metal plates composed of a Ni—Fe alloy are folded in half, are welded and secured to the tips of these lead lines 3 and 4, respectively. Zr—Al alloy is formed as a getter on one surface of each of cold cathodes 5 and 6.

Glass tube 1 is heated for degassing, and after subjecting cold cathodes 5 and 6 to high-frequency induction heating for degassing, glass tube 1 is charged with xenon and then hermetically sealed. Impure gases inside glass tube 1 are adsorbed by the getters. The phosphor that makes up phosphor layer 2 is excited by the vacuum ultraviolet light having a wavelength of 172 nm that is radiated from the xenon due to electrical discharge, and efficiently radiates UV-B ultraviolet light having a wavelength of approximately 312-315 nm as shown in FIG. 1.

A configuration in which a fluorescent lamp includes cold cathodes 5 and 6 as described above enables the provision of an ultraviolet luminescent fluorescent lamp that exhibits not only improved intensity of emission of UV-B ultraviolet light, but that also features compact size and long life. In addition, a configuration in which these cold cathodes 5 and 6 are replaced by hot cathodes allows increased lamp current, whereby the intensity of emission of UV-B ultraviolet light is even further improved.

(3) Planar Ultraviolet Luminescent Fluorescent Lamp

Figure 4:
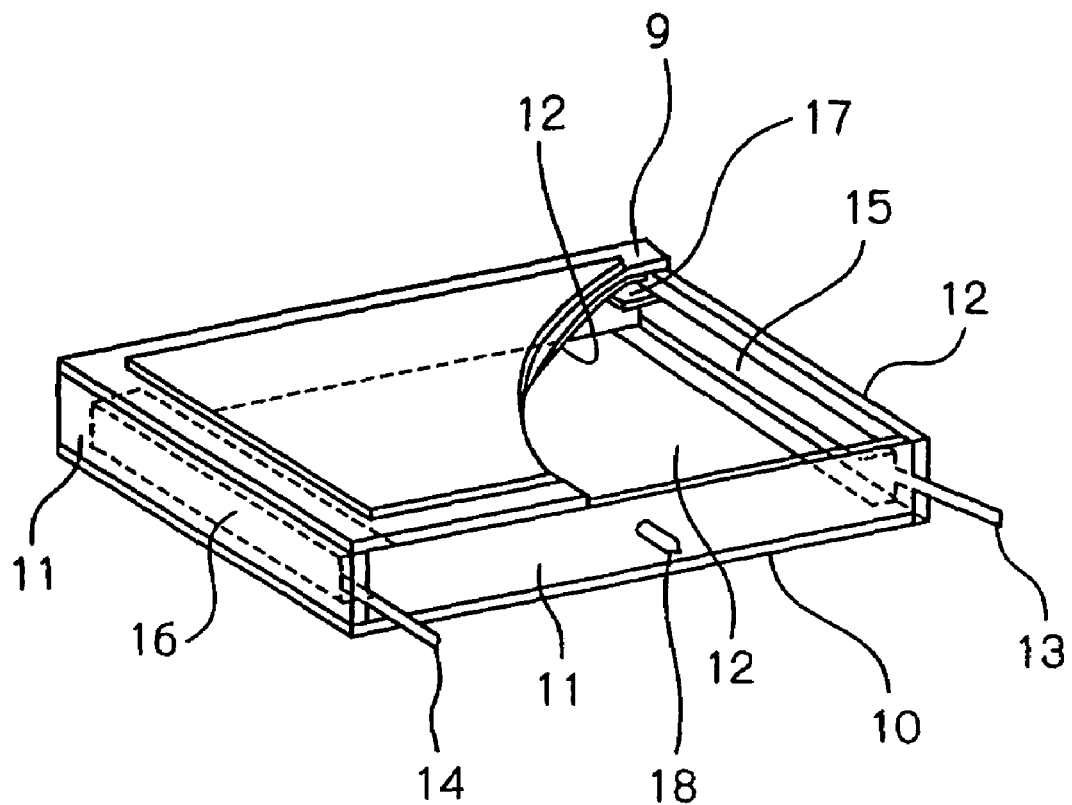
FIG. 4 is a perspective view showing the planar ultraviolet luminescent fluorescent lamp according to an embodiment of the present invention with one section cut away.

FIG. 4 is a perspective view showing a planar ultraviolet luminescent fluorescent lamp according to an embodiment of the present invention with one portion cut away.

In this planar ultraviolet luminescent fluorescent lamp, a pair of glass plates 9 and 10 composed of soda lime glass and glass sidewalls 11 that are configured in frame form are hermetically sealed together by solder glass to form a planar translucent hermetic vessel; phosphor layer 12, which contains a vacuum ultraviolet-excited phosphor that is composed of gadolinium-activated rare-earth aluminum-scandium borate [general formula $(Y_{1-x}Gd_x)Al_{3-y}Sc_y(BO_3)_4$ ($0<x\leq 1$, $0<y\leq 3$)] that emits light by ultraviolet light excitation, is formed on the inner surfaces of glass plates 9 and 10; and the interior of the hermetic vessel is charged with xenon gas.

Lead lines 13 and 14 are sealed in a pair of confronting glass sidewalls 11, and hollow-cathode cold cathodes 15 and 16, which are each a metal plate composed of, for example, nickel that is formed in a "C" shape, are welded and secured to the tips of these lead lines 13 and 14. Getter 17 that is formed from Zr—Al alloy is welded to the end of cold cathode 15. The glass vessel is heated for degassing, following which cold cathodes 15 and 16 and getter 17 are subjected to high-frequency induction heating for degassing, xenon is introduced, and exhaust tube 18 then sealed.

When a high-frequency voltage is applied to cold cathodes 15 and 16, a discharge is produced and a vacuum ultraviolet light having a wavelength of 172 nm is radiated from the xenon, whereby phosphor layer 12 efficiently radiates UV-B ultraviolet light having a wavelength of approximately 312-315 nm as shown in FIG. 1.

This configuration allows the provision of a flat ultraviolet luminescent fluorescent lamp having a larger ultraviolet light-emitting area and in which UV-B ultraviolet light having a wavelength of approximately 312-315 nm is emitted with improved intensity.

(4) Another Planar Ultraviolet Luminescent Fluorescent Lamp

Figure 5A:
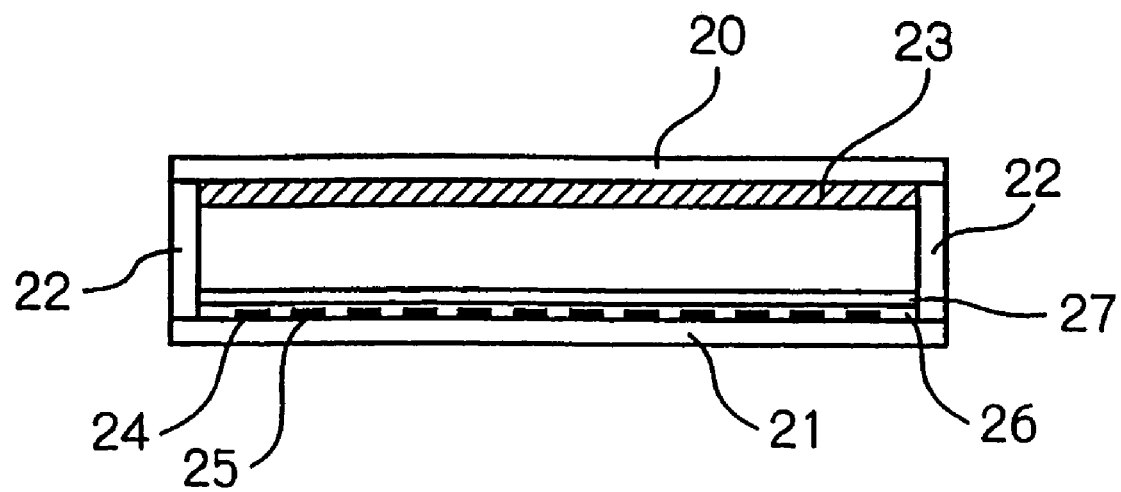
FIGS. 5A and 5B show another planar ultraviolet luminescent fluorescent lamp according to an embodiment of the present invention.
Figure 5B:
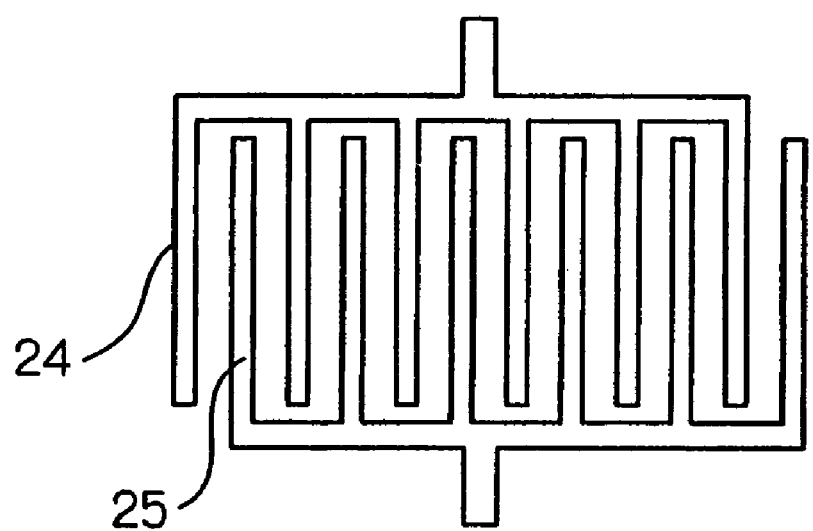

FIG. 5A and FIG. 5B show another planar ultraviolet luminescent fluorescent lamp according to an embodiment of the present invention.

In the planar ultraviolet luminescent fluorescent lamp that is shown in FIG. 5A, a pair of glass plates 20 and 21 that are composed of soda-lime glass and glass sidewalls 22 are hermetically sealed together with solder glass to form a planar glass vessel; phosphor layer 23, which contains a vacuum ultraviolet-excited phosphor that is composed of gadolinium-activated rare-earth aluminum-scandium borate [general formula $(Y_{1-x}Gd_x)Al_{3-y}Sc_y(BO_3)_4$ ($0<x\leq 1$, $0<y\leq 3$)] that emits light by ultraviolet light excitation, is formed on the inner surface of front glass plate 20; and the interior of the hermetic vessel is charged with xenon gas.

A plurality of transparent electrodes 24 and 25 that are composed of, for example, ITO ($In_2O_3Sn$) are arranged in rows on rear glass plate 21. These electrodes are covered by dielectric layer 26 composed of, for example, $SiO_2$, and protective layer 27 that is composed of, for example, MgO is additionally formed by a technique such as vapor deposition on dielectric layer 26. As shown in FIG. 5B, the electrodes are formed such that electrodes 24 and 25 of a pair of comb-like shapes are arranged alternately. Protective layer 27 has the functions of both protecting dielectric layer 26 from the sputtering that is caused by discharge and further, increasing the secondary emission coefficient and thus reducing the starting voltage. It is also possible to omit dielectric layer 26 and protective 27 and thus leave electrodes 24 and 25 exposed to the discharge space.

When a high-frequency voltage is applied to electrodes 24 and 25 to produce discharge and cause vacuum ultraviolet light having a wavelength of 172 nm to be radiated from the xenon, phosphor layer 23 efficiently radiates UV-B ultraviolet light having a wavelength of approximately 312-315 nm, as shown in FIG. 1.

(5) External-Electrode Ultraviolet Luminescent Fluorescent Lamp

Figure 6B:
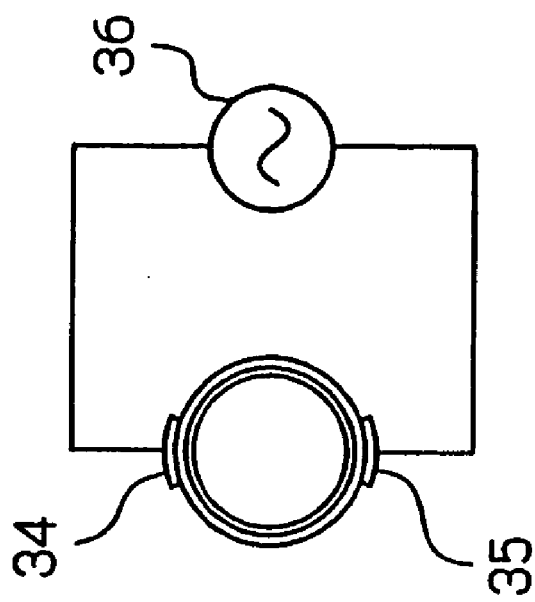
FIGS. 6A and 6B show an external-electrode ultraviolet luminescent fluorescent lamp according to an embodiment of the present invention.
Figure 6A:
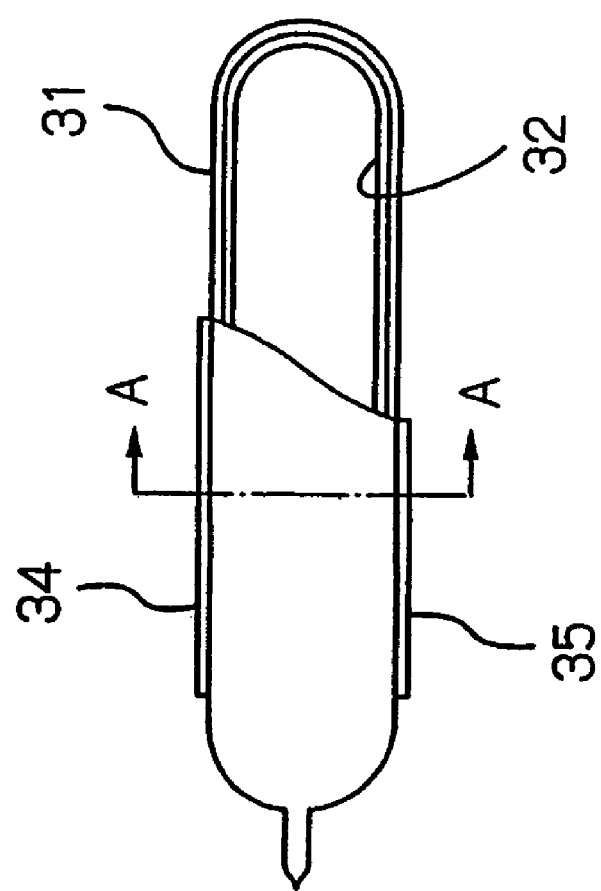

FIG. 6A and FIG. 6B show an external-electrode ultraviolet luminescent fluorescent lamp according to an embodiment of the present invention.

This external-electrode ultraviolet luminescent fluorescent lamp does not have electrodes inside the lamp, but rather, is an ultraviolet luminescent fluorescent lamp in which the application of a high-frequency electromagnetic field from the outside excites the discharge gas inside the lamp and thus causes the phosphor to emit light. As shown in FIGS. 6A and 6B, in this external-electrode ultraviolet luminescent fluorescent lamp, phosphor layer 32 that contains a vacuum ultraviolet-excited phosphor that is composed of gadolinium-activated rare-earth aluminum-scandium borate [general formula $(Y_{1-x}Gd_x)Al_{3-y}Sc_y(BO_3)_4$ ($0<x\leq 1$, $0<y\leq 3$)] that emits light by ultraviolet light excitation, is formed on the inner surface of a translucent hermetic vessel that is composed of soda glass tube 31; and xenon gas is sealed inside the translucent hermetic vessel.

The electrodeless fluorescent lamp that is thus configured is interposed between a pair of external electrodes 34 and 35, and when high-frequency power supply 36 is used to apply a high-frequency voltage to external-electrodes 34 and 35 to bring about discharge and cause vacuum ultraviolet light having a wavelength of 172 nm to be radiated from the xenon, phosphor layer 32 efficiently radiates UV-B ultraviolet light having a wavelength of approximately 312-315 nm, as shown in FIG. 1.

This configuration enables the provision of a ultraviolet luminescent fluorescent lamp that features improved emitted intensity of UV-B ultraviolet light having a wavelength of approximately 312-315 nm, compact size, long life, simple construction, and further, low cost.

(6) Plasma Display Panel (PDP)

Figure 7:
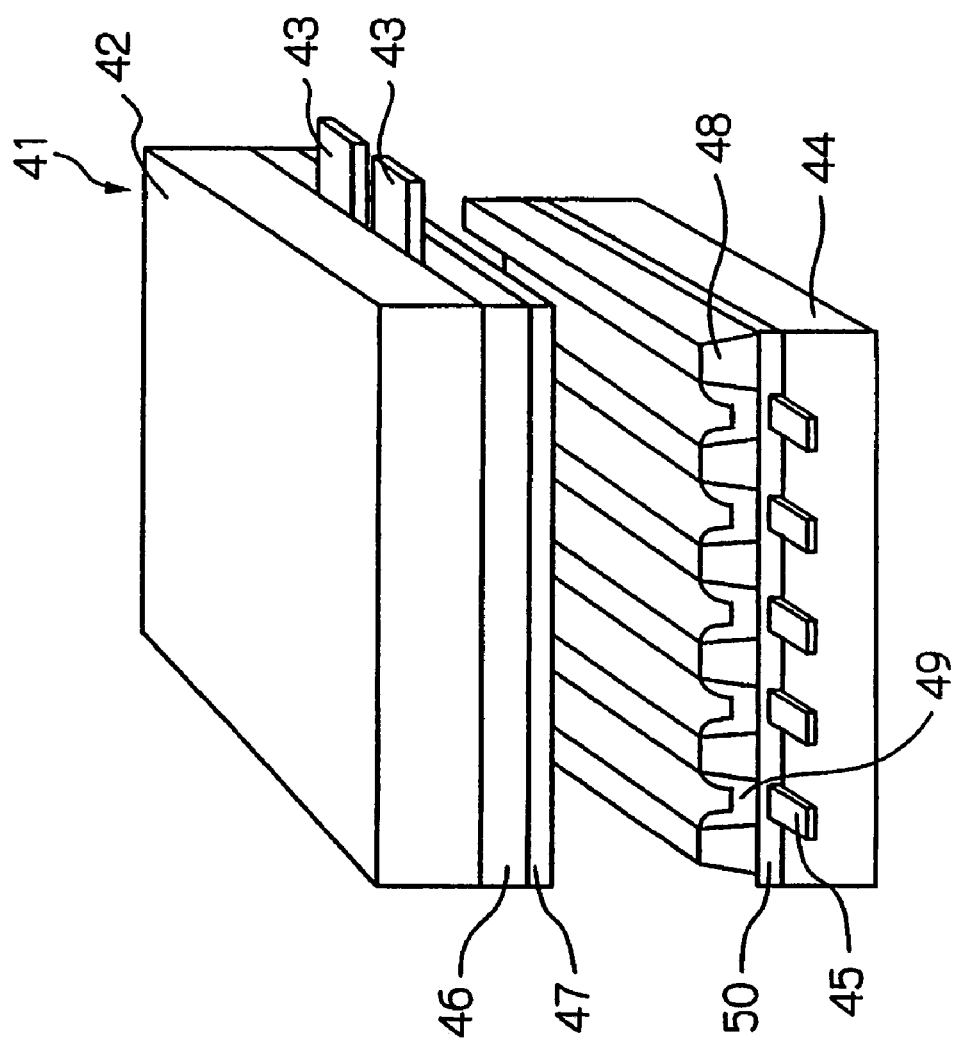
FIG. 7 is an exploded perspective view showing a plasma display panel according to an embodiment of the present invention.

FIG. 7 is an exploded perspective view showing a plasma display panel according to an embodiment of the present invention. The plasma display panel (hereinbelow abbreviated "PDP") that is shown in FIG. 7 is an AC surface-discharge PDP.

PDP 41 that is shown in FIG. 7 has two types of electrodes: display electrodes 43 that are formed as a pair on front glass substrate 42 and address electrodes 45 that are formed in rear glass substrate 44. These electrodes are arranged in matrix on two glass substrates 42 and 44 respectively and thus form display dots that are each constituted by an intersection of these electrodes. Display electrodes 43 on the front glass side are formed by etching, into stripe form, a transparent conductive film that is composed of, for example, ITO ($In_2O_3Sn$) that is formed by vapor deposition. In addition, dielectric layer 46 that functions as a capacitor is formed on display electrodes 43, and protective layer 47 composed of MgO is additionally formed on dielectric layer 46. On the other hand, barriers 48 that are formed in stripe form by thick-film screen printing are provided between adjacent address electrodes 45, and each display dot is thus separated and made independent. In addition, phosphor layer 49 that contains a vacuum ultraviolet-excited phosphor that is composed of gadolinium-activated rare-earth aluminum-scandium borate [general formula $(Y_{1-x}Gd_x)Al_{3-y}Sc_y(BO_3)_4$ ($0<x\leq1$, $0<y\leq3$)] that emits light by ultraviolet light excitation, is applied to dielectric layer 50 that is formed on address electrodes 45 and the side surfaces of barriers 48, and the discharge spaces that are enclosed by barriers 48 and front glass substrate 42 are charged with an inert gas mixture that contains xenon (Xe).

Display is realized by applying AC voltage across display electrodes 43 that are provided in pairs, and the selection of cells that are to display is realized by the application of voltage across any address electrode 45 and display electrode 43 and the resulting discharge that is produced at the intersection of these electrodes 43 and 45. The excited light of the vacuum ultraviolet light that is radiated by the glow discharge of xenon (Xe) at this time causes phosphor layer 49 to emit light.

While preferred embodiments of the present invention have been described using specific terms, such description is for illustrative purposes only, and it is to be understood that changes and variations may be made without departing from the spirit or scope of the following claims.

What is claimed is:

1. A vacuum ultraviolet-excited phosphor composed of a gadolinium activated rare-earth aluminum-scandium borate that is represented by a general formula $(Y_{1-x}Gd_x)Al_{3-y}Sc_y(BO_3)_4$ (where $0<x\leq1$, $0<y<3$).

2. The vacuum ultraviolet-excited phosphor according to claim 1, wherein $0.1\leq y\leq2.9$.

3. An ultraviolet luminescent fluorescent lamp, comprising: a translucent hermetic vessel; a discharge medium for discharging vacuum ultraviolet light that is sealed within said translucent hermetic vessel; discharge electrodes; and a phosphor layer that is formed on an inner surface of said translucent hermetic vessel; wherein said phosphor layer includes a vacuum ultraviolet-excited phosphor that is composed of a gadolinium-activated rare-earth aluminum-scandium borate represented by a general formula $(Y_{1-x}Gd_x)Al_{3-y}Sc_y(BO_3)_4$ (where $0<x\leq1$, $0<y<3$).

4. An ultraviolet luminescent fluorescent lamp according to claim 3, wherein said ultraviolet luminescent fluorescent lamp is a fluorescent lamp having a cold cathode or a hot cathode.

5. An ultraviolet luminescent fluorescent lamp according to claim 3, wherein said ultraviolet luminescent fluorescent lamp is a planar fluorescent lamp.

6. An ultraviolet luminescent fluorescent lamp according to claim 3, wherein said ultraviolet luminescent fluorescent lamp is an external-electrode fluorescent lamp.

7. An ultraviolet luminescent fluorescent lamp according to claim 3, wherein said discharge medium is a rare gas.

8. An ultraviolet luminescent fluorescent lamp according to claim 7, wherein said rare gas is xenon gas.

9. The ultraviolet luminescent fluorescent lamp according to claim 3, wherein $0.1\leq y\leq2.9$.

10. A plasma display panel, wherein: a front glass substrate and a rear glass substrate are arranged to confront each other, and discharge is produced inside display cells that are formed between said two glass substrates to cause a phosphor layer that is formed inside said display cells to emit light and thus realize display; and said phosphor layer includes a vacuum ultraviolet-excited phosphor that is composed of a gadolinium-activated rare-earth aluminum-scandium borate represented by a general formula $(Y_{1-x}Gd_x)Al_{3-y}Sc_y(BO_3)_4$ (where $0<x\leq1$, $0<y\leq3$).

11. The plasma display panel according to claim 10, wherein $0.1\leq y\leq2.9$.

* * * * *